United States Patent
Song et al.

(10) Patent No.: US 11,882,580 B2
(45) Date of Patent: *Jan. 23, 2024

(54) METHODS AND APPARATUSES FOR RECEIVING AND TRANSMITTING CONFIGURATION INFORMATION AND COMMUNICATION SYSTEM

(71) Applicant: FUJITSU LIMITED, Kawasaki (JP)

(72) Inventors: Lei Song, Beijing (CN); Xin Wang, Beijing (CN); Zhe Chen, Beijing (CN); Lei Zhang, Beijing (CN); Guoyu Zhang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/829,502

(22) Filed: Jun. 1, 2022

(65) Prior Publication Data
US 2022/0295494 A1 Sep. 15, 2022

Related U.S. Application Data

(63) Continuation of application No. 16/918,533, filed on Jul. 1, 2020, now Pat. No. 11,382,105, which is a
(Continued)

(51) Int. Cl.
*H04W 72/04* (2023.01)
*H04W 72/53* (2023.01)
(Continued)

(52) U.S. Cl.
CPC .......... *H04W 72/53* (2023.01); *H04L 5/0051* (2013.01); *H04L 5/10* (2013.01); *H04W 72/0446* (2013.01);
(Continued)

(58) Field of Classification Search
CPC .......... H04W 72/0446; H04W 72/042; H04W 72/53; H04W 72/23; H04W 76/27;
(Continued)

(56) References Cited

U.S. PATENT DOCUMENTS 4,430,702 A 2/1984 Schiebe et al.
2013/0016686 A1 1/2013 Li et al.
(Continued)

FOREIGN PATENT DOCUMENTS

CN 102202408 A 9/2011
CN 104620512 A 5/2015
(Continued)

OTHER PUBLICATIONS

Extended European search report with the European search opinion issued by the European Patent Office for corresponding European Patent Application No. 22197887.7-1213, dated Dec. 19, 2022.
(Continued)

*Primary Examiner* — Wei Zhao
(74) *Attorney, Agent, or Firm* — Myers Wolin, LLC

(57) ABSTRACT

Methods and apparatuses for receiving and transmitting configuration information and a communication system. The method includes: configuring or predefining one or more transmission configuration indication states by a terminal equipment for one or more demodulation reference signal port groups. Hence, even in scenarios such as multiple TRPs or multiple panels, the receiving device may correctly and punctually receive transmission information transmitted by the transmitting device.

14 Claims, 4 Drawing Sheets

Related U.S. Application Data continuation of application No. PCT/CN2018/076511, filed on Feb. 12, 2018.

(51) Int. Cl.

| | | |
|---|---|---|
| *H04W 76/27* | (2018.01) | |
| *H04L 5/00* | (2006.01) | |
| *H04L 5/10* | (2006.01) | |
| *H04W 72/0446* | (2023.01) | |
| *H04W 80/02* | (2009.01) | |
| *H04W 72/23* | (2023.01) | |

(52) U.S. Cl.
CPC .......... *H04W 72/23* (2023.01); *H04W 76/27* (2018.02); *H04W 80/02* (2013.01)

(58) Field of Classification Search
CPC .. H04W 80/02; H04W 72/044; H04L 5/0051; H04L 5/005; H04L 5/10
See application file for complete search history.

(56) References Cited

U.S. PATENT DOCUMENTS

| | | | |
|---|---|---|---|
| 2013/0294318 A1 | 11/2013 | Amerga et al. | |
| 2014/0204807 A1 | 7/2014 | Li et al. | |
| 2015/0230214 A1 | 8/2015 | Tong et al. | |
| 2018/0206132 A1* | 7/2018 | Guo | H04B 7/0695 |
| 2019/0159209 A1 | 5/2019 | Xiao et al. | |
| 2019/0174466 A1* | 6/2019 | Zhang | H04L 5/0057 |
| 2020/0395988 A1* | 12/2020 | Lee | H04L 5/0057 |

FOREIGN PATENT DOCUMENTS

| | | |
|---|---|---|
| CN | 106470174 A | 3/2017 |
| CN | 107342852 A | 11/2017 |

OTHER PUBLICATIONS

Notice of Reasons for Refusal issued by the Japan Patent Office for corresponding Japanese Patent Application No. 2022-069640, dated Jan. 31, 2023, with an English translation.

First Notification of Office Action and Search Report issued by the China National Intellectual Property Administration for corresponding Chinese Patent Application No. 201880083396.7, dated Aug. 3, 2022, with an English translation.

International Search Report issued by the State Intellectual Property Office of the P.R. China for corresponding International Patent Application No. PCT/CN2018/076511, dated Oct. 12, 2018, with an English translation.

Written Opinion of the International Searching Authority issued by the State Intellectual Property Office of the P.R. China for corresponding International Patent Application No. PCT/CN2018/076511, dated Oct. 12, 2018, with an English translation.

Zte et al., "Discussion on beam management", Agenda Item: 7.2.2.3, 3GPP TSG-RAN WG1 Meeting #91, R1-1719533, Reno, USA, Nov. 27-Dec. 1, 2017.

Huawei et al., "Beam indication for control and data channels", Agenda Item: 7.2.2.6, 3GPP TSG-RAN WG1 Meeting #90bis, R1-1718238, Prague, Czech Republic, Oct. 9-13, 2017.

Extended European search report with supplementary European search report and the European search opinion issued by the European Patent Office for corresponding European Patent Application No. 18905643.5-1205, dated Jan. 21, 2021.

Zte et al. "Details and evaluation results on beam indication", Agenda Item: 7.2.2.6, 3GPP TSG-RAN WG1 Meeting #91, R1-1719538, Reno, USA, Nov. 27-Dec. 1, 2017.

Nokia et al. "Summary of QCL", Agenda Item: 7.2.3.7, 3GPP TSG-RAN WG1 Meeting #AH 1801, R1-1801054, Vancouver, Canada, Jan. 22-26, 2018.

Notice of Reasons for Refusal issued by the Japan Patent Office for corresponding Japanese Patent Application No. 2020-538667, dated Sep. 14, 2021, with an English translation.

Non-Final Office Action issued by the United States Patent and Trademark Office for corresponding U.S. Appl. No. 16/918,533, dated Oct. 8, 2021.

Notice of Allowance issued by the United States Patent and Trademark Office for corresponding U.S. Appl. No. 16/918,533, dated Mar. 2, 2022.

* cited by examiner

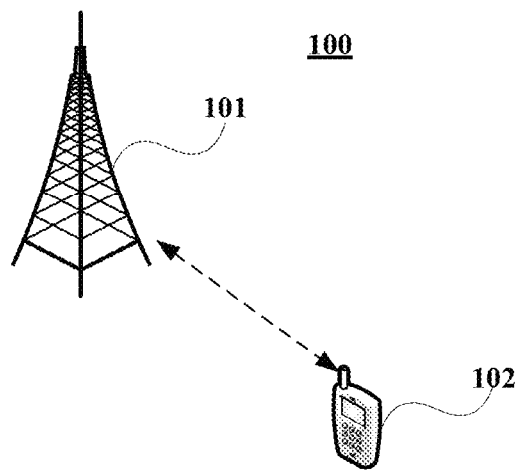
Fig. 1
|  | A | Threshold | D |
|---|---|---|---|
| 'TCI-PresentInDCI' is enabled | TCI state of a CORESET with the lowest CORESET ID | | TCI state indicated by the DCI |
| 'TCI-PresentInDCI' is disabled | B TCI state of a CORESET with the lowest CORESET ID | | C TCI state of the scheduled CORESET |
Fig. 2
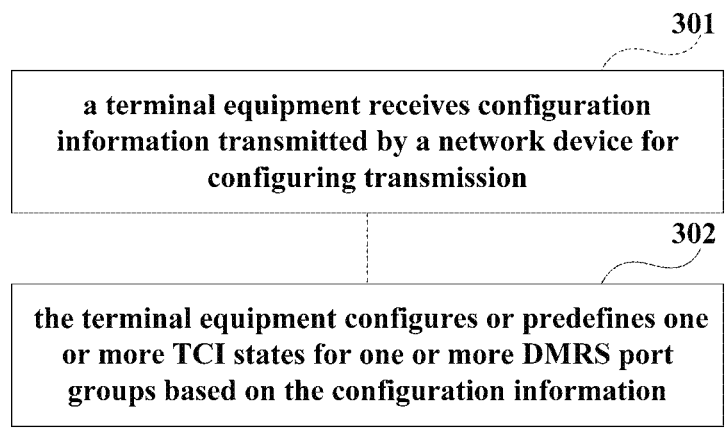
Fig. 3

METHODS AND APPARATUSES FOR RECEIVING AND TRANSMITTING CONFIGURATION INFORMATION AND COMMUNICATION SYSTEM

CROSS REFERENCE TO RELATED APPLICATIONS

This application is a continuation of U.S. application Ser. No. 16/918,533, filed on Jul. 1, 2020, which is a continuation application of International Application No. PCT/CN2018/076511, filed on Feb. 12, 2018, the contents of which are incorporated herein by reference.

TECHNICAL FIELD

This disclosure relates to the field of communication technologies, and in particular to methods and apparatuses for receiving and transmitting configuration information and a communication system.

BACKGROUND

The massive multiple-input multiple-output (MIMO) technique is a key technique for new radio (NR) systems, and includes research on frequency bands below 6 GHz and above 6 GHz. As frequency bands increase, fading and loss generated during transmission will increase accordingly. The beamforming technique has become a key technique in massive MIMO because it is able to effectively compensate for fading.

In the research of MIMO technique, in order to improve the reliability of transmission, the beamforming technique in which multiple beams are transmitted simultaneously for physical channels (such as broadcast channels, data channels, and control channels, etc.) is allowed. Since both a network device and a user equipment (UE) have abilities to transmit and receive multiple beams, optimal combination of beam transmission and reception may be obtained through beam management, such as performing beam sweeping respectively by a receiving device and a transmitting device.

For example, downlink beam management in an NR system in the current 3GPP (3rd Generation Partnership Project) includes three processes:

process 1 (P1): a base station transmits multiple different beams, and a user equipment measures the beams and selects one or more transmitting beams of better quality;

process 2 (P2): the base station transmits multiple different beams; compared with process 1, the beams in process 2 are more precise (narrow), which may be a smaller set of beams in process 1; and the UE measures the beams and selects transmitting beams of better quality; and process 3 (P3): the base station transmits multiple identical beams, and the UE uses different receiving beams to receive, thereby selecting one or more receiving beams of better quality.

It can be seen that through the three processes of beam management, the UE may obtain quality conditions of beam pair links (BPL) of multiple different beams of a transmitting device and multiple different beams of a receiving device. The current NR system supports reporting of quality of multiple transmitting beams by the UE, such as reporting the beam IDs of better quality and corresponding reference signal received power (RSRP) to the base station. The beam IDs may be represented by, for example, resource IDs of a channel state information reference signal (CSI-RS) and/or time IDs of a synchronization signal (SS) block.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in some cases, such as multiple transmission points (referred to as multi-TRPs) or multiple antenna panels (referred to as multi-panels), incorrect reception of transmission information due to inaccuracy of transmission configuration may occur.

Embodiments of this disclosure provide methods and apparatuses for receiving and transmitting configuration information and a communication system, in which it is expected that even in scenarios such as multiple TRPs or multiple panels, the receiving device may correctly and punctually receive transmission information transmitted by the transmitting device.

According to a first aspect of the embodiments of this disclosure, there is provided a method for receiving configuration information, including:
  receiving by a terminal equipment configuration information transmitted by a network device for configuring transmission; and
  configuring or predefining one or more transmission configuration indication states for one or more demodulation reference signal port groups by the terminal equipment based on the configuration information.

According to a second aspect of the embodiments of this disclosure, there is provided an apparatus for receiving configuration information, including:
  a receiving unit configured to receive configuration information transmitted by a network device for configuring transmission; and
  a configuring unit configured to configure or predefine one or more transmission configuration indication states for one or more demodulation reference signal port groups based on the configuration information.

According to a third aspect of the embodiments of this disclosure, there is provided a method for transmitting configuration information, including:
  transmitting configuration information for configuring transmission by a network device to a terminal equipment, the configuration information being used by the terminal equipment to configure or predefine one or more transmission configuration indication states for one or more demodulation reference signal port groups.

According to a fourth aspect of the embodiments of this disclosure, there is provided an apparatus for transmitting configuration information, including:
  a transmitting unit configured to transmit configuration information for configuring transmission to a terminal equipment, the configuration information being used by the terminal equipment to configure or predefine one or more transmission configuration indication states for one or more demodulation reference signal port groups.

According to a fifth aspect of the embodiments of this disclosure, there is provided a communication system, including:

a terminal equipment, including the method for receiving configuration information as described above; and a network device, including the method for transmitting configuration information as described above.

An advantage of the embodiments of this disclosure exists in that a receiving device configures or predefines one or more transmission configuration indication (TCI) states for one or more demodulation reference signal (DMRS) port groups. Hence, even in scenarios such as multiple TRPs or multiple panels, the receiving device may correctly and punctually receive transmission information transmitted by a transmitting device.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 1 is a schematic diagram of a communication system of an embodiment of this disclosure;

FIG. 2 is a schematic diagram of a TCI state of an embodiment of this disclosure;

FIG. 3 is a schematic diagram of the method for receiving configuration information of an embodiment of this disclosure;

DETAILED DESCRIPTION

Figure 4:
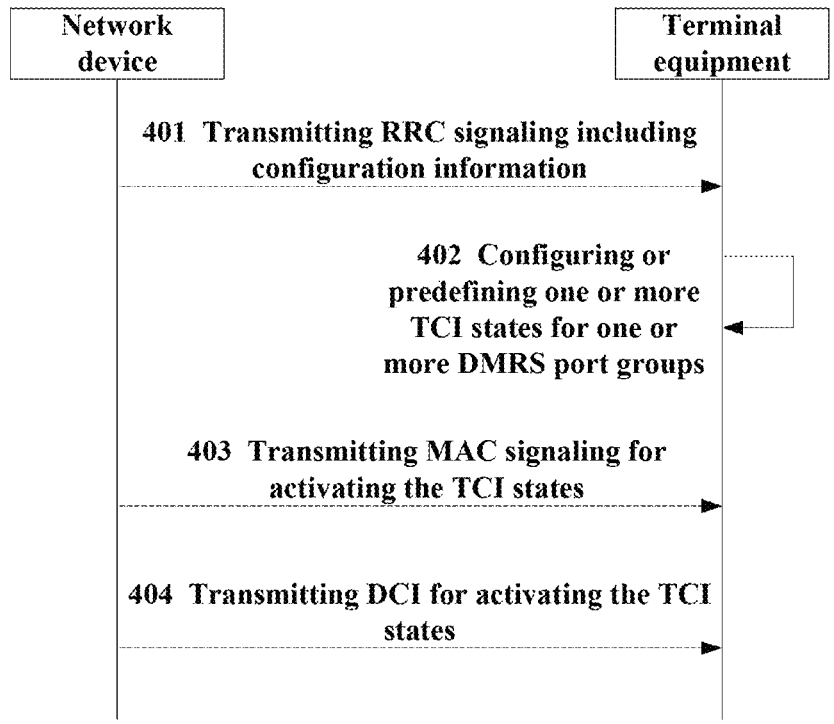
FIG. 4 is a schematic diagram of the method for transmitting and receiving configuration information of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a dedicated geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Furthermore, the term "a network side" or "a network device side" refers to a side at a network, may be a base station, and may include one or more of the above network devices. And the term "a user equipment side" or "a terminal equipment side" refers to a side at a user equipment or a terminal equipment, may be a user equipment, and may include one or more of the above terminal equipments.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, an example having one terminal equipment and a network device is schematically given in FIG. 1; however, the embodiment of this disclosure is not limited thereto. For example, the network device 101 may be multiple, so as to form multiple TRP transmission or multiple panel transmission.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC), etc.

In this disclosure, after the network device obtains beams with better quality reported by the terminal equipment, these beams may be used in transmission of physical channels (such as broadcast channels, data channels, and control channels, etc.) to obtain relatively high transmission quality. And the NR supports the network device to indicate the used transmission beam to the terminal equipment, so that the terminal equipment may decide which reception beam is to be used for alignment and reception. In addition, the beam indication may be equivalent to a spatial quasi-co-location (QCL) indication, and may also be equivalent to an indication of a transmission configuration indication (TCI) state.

In the NR system, in performing beam indication for a physical downlink control channel (PDCCH), radio resource control (RRC) signaling and/or media access control (MAC) signaling (e.g. MAC-CE) may be used. For example, RRC signaling may be used to configure K TCI states for each control resource set (hereinafter referred to as a CORESET); for a CORESET, when K>1, MAC-CE is used to further activate a state in the K TCI states; and when K=1, there is no need to use MAC-CE for activation, and the TCI state configured by the RRC is the TCI state of the CORESET. When a piece of downlink control information (DCI) is transmitted, its TCI state is in consistence with a TCI state of CORESET used in its actual transmission.

In performing beam indication for a physical downlink shared channel (PDSCH), RRC signaling and/or a MAC-CE and/or DCI may be used. For example, M TCI states are configured via RRC signaling, the MAC-CE activates $2^N$ TCI states in M states, and in DCI transmission, N bits are used to indicate a TCI in $2^N$ states.

As reception beamforming in the analog domain is performed when a signal reaches an antenna element, for some symbols of a PDSCH, in performing analog domain beamforming on it, TCI indication information contained in the DCI may not be decoded, so it is not possible to select an appropriate reception beam for analog beamforming.

Therefore, a time offset threshold is defined in the NR, that is, when a time offset between the moment when DCI is received and a symbol of a scheduled PDSCH is less than a threshold, the terminal equipment assumes that a TCI state of a PDSCH on the symbol is consistent with a TCI state of a CORESET of a lowest ID in all CORESETs configured in this slot. When the time offset between the moment when the DCI is received and a symbol of the scheduled PDSCH is greater than or equal to a threshold, the terminal equipment assumes that the TCI state of the PDSCH on the symbol is consistent with the TCI state indicated in the DCI. In calculating the time offset, the time when the DCI is received may also be replaced with a fixed time that is clear to both the network device and the terminal equipment. A symbol of the PDSCH may be a first orthogonal frequency division multiplexing (OFDM) symbol occupied by the scheduled PDSCH in the time dimension, or may be a first OFDM symbol of the scheduled PDSCH in each slot, that is, each slot calculates a time offset value, which is then compared with a time offset threshold.

In addition, the TCI state of the PDSCH may not be indicated. Whether the TCI state of the PDSCH is indicated may be dependent on a parameter TCI-PresentInDCI indicating a dynamic TCI state configured by a higher layer. RRC signaling configures the parameter TCI-PresentInDCI for each CORESET. When the parameter is enabled, it means that the DCI transmitted in the CORESET contains a TCI state indication field; and when the parameter is disabled, it means that the DCI transmitted in this CORESET does not contain a TCI state indication field. When the TCI state of the PDSCH is not indicated or the terminal equipment does not receive the TCI state indication, a default TCI state needs to be defined so that the network device and the terminal equipment may perform transmission and reception of analog domain beams according to the default TCI state.

FIG. 2 is a schematic diagram of the TCI state of the embodiment of this disclosure. As shown in FIG. 2, when the time offset between the moment when the DCI is received and a symbol of the scheduled PDSCH is less than a threshold, the default DCI state is adopted, and the default DCI state is a TCI state of a CORESET with the lowest ID in all the CORESETs configured in this slot, as shown in A and B in FIG. 2; when TCI-PresentInDCl is disabled and the time offset between the moment when the DCI is received and a symbol of the scheduled PDSCH is greater than or equal to the threshold, the TCI state of the scheduled CORESET is used, as shown in C in FIG. 2; and when TCI-PresentInDCl is enabled and the time offset between the moment when the DCI is received and a symbol of the scheduled PDSCH is greater than or equal to the threshold, the TCI state indicated in DCI is adopted, as shown in D in FIG. 2.

However, in multi-TRP or multi-panel scenarios, the default TCI state or QCL parameter of the PDSCH may be different from those in single-point transmission, and a case where the receiving device may not correctly and punctually receive transmission information due to inaccuracy of transmission configuration may occur in the receiving device (such as a UE).

In the following, the embodiments of this disclosure shall be described by taking an NR system and a PDSCH as examples; however, this disclosure is not limited to this, and it may also be applied to any system or scenario where similar problems exist.

Embodiment 1

The embodiments of this disclosure provide a method for receiving configuration information. FIG. 3 is a schematic diagram of the method for receiving configuration information of the embodiment of this disclosure, in which a case at a terminal equipment side is shown. As shown in FIG. 3, the method includes:

step 301: a terminal equipment receives configuration information transmitted by a network device for configuring transmission; and step 302: the terminal equipment configures or predefines one or more transmission configuration indication states for one or more demodulation reference signal port groups based on the configuration information, respectively.

In an embodiment, the TCI state of the demodulation reference signal port group is configured or defined, for example, it may be predefined in a standard, in which case step 301 is optional. In addition, it may also be configured by the network device via RRC signaling.

FIG. 4 is a schematic diagram of the method for transmitting and receiving configuration information of an embodiment of this disclosure, further describing from the network device side and the terminal equipment side. As shown in FIG. 4, the method includes:

step 401: the network device transmits RRC signaling including configuration information to the terminal equipment;

step 402: the terminal equipment configures or predefines one or more transmission configuration indication states for one or more demodulation reference signal port groups based on the configuration information.

As shown in FIG. 4, the method may further include:

step 403: the network device transmits MAC signaling for activating the transmission configuration indication states to the terminal equipment; and/or step 404: the network device transmits DCI for activating the transmission configuration indication states to the terminal equipment.

It should be noted that FIG. 4 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4.

Therefore, the receiving device configures or predefines one or more TCI states for the DMRS port group; even in scenarios such as multiple TRPs or multiple panels, the receiving device may correctly and punctually receive transmission information transmitted by the transmitting device.

In an embodiment, the terminal equipment may also determine the TCI states and/or QCL parameter of the DMRS port group of one or more physical channels according to the transmission scheme (TS) and/or parameter configured by the network device.

For example, in a multi-TRP and/or multi-panel scenario, the TS of the terminal equipment may be configured by a higher layer with parameters different from those in single-point transmission. For example, in the single-point transmission, the TS of the terminal equipment may be configured as transmission scheme 1 (TS1) or transmission scheme 2 (TS2); while in multi-TRP transmission, the TS of the terminal equipment may be configured as transmission scheme 3 (TS3), and in multi-panel transmission, the TS of the terminal equipment may be configured as transmission scheme 4 (TS4); or, in multi-panel transmission, the TS of the terminal equipment may be configured as transmission scheme 3 (TS3), and in multi-TRP transmission, the TS of the terminal equipment may be configured as transmission scheme 4 (TS4); or, in multi-TRP or multi-panel transmission, the TS of the terminal equipment may be configured as transmission scheme 3 (TS3), that is, the same transmission scheme (TS).

For another example, instead of instructing the terminal equipment to perform single-point transmission or multi-point transmission via the configured transmission schemes (TSs), the terminal equipment is instructed via other parameters configured by a higher layer to perform operations associated with multiple TRPs or multiple panels. For example, a parameter a configured by the higher layer is used to instruct the terminal equipment to perform operations associated with single-point transmission, and a parameter b is used to instruct the terminal equipment to perform operations associated with multi-point transmission and/or multi-panel transmission.

For a further example, instead of explicitly indicating operations associated with multiple TRPs and/or multiple panels by using the parameters configured by the higher layer, the operations associated with multiple TRPs and/or multiple panels are implicitly indicated by using the parameters configured by the higher layer and/or further indication of the MAC layer and/or further indication of the physical layer. For example, when the above time offset is less than the threshold, the TCI states or QCL parameters of n (n>=1) PDSCHs configured by the higher layer may be further activated or indicated by using MAC signaling so as to determine the TCI states or QCL parameters of one or more PDSCHs. TCI states or QCL parameters of one or more PDSCHs finally configured via RRC or determined by other control signaling may implicitly reflect the TCI states or QCL parameters of the PDSCHs in single-point transmission or multi-point transmission or multi-panel transmission.

For yet another example, when the above time offset is greater than or equal to the threshold and TCI-PresentInDCI of the CORESET scheduling the PDSCH is set to be enabled, the TCI states or QCL parameters of m (m>=1) PDSCHs configured by the higher layer may further be indicated by using MAC signaling and/or physical layer signaling so as to determine the TCI states or QCL parameters of the one or more PDSCHs. TCI states or QCL parameters of one or more PDSCHs finally configured via RRC or determined by other control signaling may implicitly reflect the TCI states or QCL parameters of the PDSCHs in single-point transmission or multi-point transmission or multi-panel transmission.

That is, in a multi-TRP and/or multi-panel scenario(s), a transmission scheme (for example, TS3 or TS4) may be explicitly configured for the terminal equipment, and different transmission schemes correspond to default TCI states and/or QCL parameters of different PDSCHs. For example, when the above time offset is less than the threshold, or the time offset is greater than or equal to the threshold and TCI-PresentlnDCl of the CORESET scheduling the PDSCHs is set to be enabled, the default TCI states or QCL parameters of the PDSCHs are all provided in an agreement.

Or, in a multi-TRP and/or multi-panel scenario(s), when the above time offset is less than the threshold, or the above time offset is greater than or equal to the threshold and TCI-PresentInDCI of the CORESET scheduling the PDSCHs is set to enabled, the default TCI states and/or QCL parameters of the PDSCHs are configured by higher layer signaling, and may further be activated or indicated by MAC signaling and/or physical layer signaling.

Thus, the TCI states and/or QCL parameters of the DMRS port group of one or more physical channels are determined according to the TS and/or parameters configured by the network device, so that the multi-TRP or multi-panel scheme may be transparent to the terminal equipment, thereby reducing processing complexity of terminal equipment.

In an embodiment, in the case where the time offset between the DCI and the corresponding PDSCH is less than the preset threshold, one or more DMRS port groups of the PDSCH are configured with or predefined as default TCI states. And this embodiment is directed to cases shown in A and B in FIG. 2.

For example, in a multi-TRP scenario, when the transmission mode is non-coherent joint transmission (NC-JT), at least two DMRS port groups are configured with or predefined as default TCI states; and when the transmission mode is a dynamic point selection (DPS) mode, one DMRS port group is predefined as a default TCI state.

For example, when the time offset is less than the time offset threshold, the terminal equipment assumes that a TCI state of a CORESET with a lowest CORESET-ID in a DMRS port group of the PDSCH and a TCI state of a CORESET in the most recent slot are quasi co-located (QCL, i.e. the TCI states are identical). When the terminal equipment is scheduled by two or more TRPs, TCI states of PDSCHs scheduled by different TRPs are different, and the TCI state of the CORESET with the lowest CORESET-ID may only be consistent with a TCI state of a PDSCH scheduled by one of the TRPs. In this case, if the TCI state of CORESET with the lowest CORESET-ID is still used as the default TCI state when the time offset is less than the threshold, the terminal equipment may only receive a PDSCH transmitted by one TRP.

In an embodiment, antenna port of the DMRS port group of the PDSCH and one or more reference signal sets in one or more control resource sets are spatially quasi-co-located. For example, it may be directed to each DMRS port group, or directed to some or all DMRS port groups.

For example, the one or more reference signal sets are at least two reference signal sets to which an activated TCI state in the CORESET with the lowest CORESET-ID corresponds. For example, in a multi-TRP or multi-panel scenario, the TCI state of CORESET with the lowest CORESET-ID always corresponds to at least two RS sets after being activated by an MAC-CE, each RS set corresponding to a TCI states of different DMRS port groups.

That is, antenna ports in one or more DMRS port groups of the PDSCH and reference signals in one or more reference signal sets of the TCI state of the CORESET with the lowest CORESET-ID used for PDCCH QCL indication in a most recent slot configured with one or more CORESETs are QCL, respectively. For example, antenna ports in a first DMRS port group and reference signals in a first reference signal set of the TCI state of the CORESET with the lowest CORESET-ID used for PDCCH QCL indication in the most recent slot configured with one or more CORESETs are QCL, antenna ports in a second DMRS port group and reference signals in a second reference signal set of the TCI state of the CORESET with the lowest CORESET-ID used for PDCCH QCL indication in the most recent slot configured with one or more CORESETs are QCL, and so on.

For another example, the one or more reference signal sets are at least two reference signal sets to at least two activated TCI states in the CORESET with the lowest CORESET-ID correspond. For example, the TCI state of CORESET with the lowest CORESET-ID contains at least two after being activated by an MAC-CE.

That is, the antenna ports in the one or more DMRS port groups of the PDSCH and the reference signal (set) in the one or more TCI states of the CORESET with the lowest CORESET-ID used for PDCCH QCL indication the in the recent slot configured with one or more CORESETs are QCL, respectively. For example, antenna ports in a first DMRS port group and reference signal (set) in a first TCI state of the CORESET with the lowest CORESET-ID used for PDCCH QCL indication in the most recent slot configured with one or more CORESETs are QCL, antenna ports in a second DMRS port group and reference signal (set) in a second reference signal set of the TCI state of the CORESET with the lowest CORESET-ID used for PDCCH QCL indication in the most recent slot configured with one or more CORESETs are QCL, and so on.

For a further example, the one or more reference signal sets are at least two reference signal sets to which TCI states configured as being of default in at least two CORESETs correspond. For example, TCI states of two or more CORESETs may be simultaneously configured as default TCI states, that is, two or more CORESET IDs are simultaneously configured, and the configured TCI states of multiple CORESETs take effect at the same time.

That is, the antenna ports in the one or more DMRS port groups of the PDSCH and the reference signal (set) in TCI states having one or more CORESET used for PDCCH QCL indication in the recent slot configured with one or more CORESETs are QCL, respectively. For example, antenna ports in a first DMRS port group and reference signal (set) of a first TCI state of the CORESET with the lowest CORESET-ID used for PDCCH QCL indication in the most recent slot configured with one or more CORESETs are QCL, antenna ports in a second DMRS port group and reference signal (set) of a TCI state of the CORESET with a less lowest CORESET-ID used for PDCCH QCL indication in the most recent slot configured with one or more CORESETs are QCL, and so on.

It should be noted that the above examples only schematically illustrate this disclosure, and the CORESET ID QCL with the antenna ports in the DMRS port groups is not limited thereto; for example, it may be the lowest CORESET-ID, and the less lowest CORESET-ID, etc., and this disclosure is not limited thereto.

Thus, in the case where the time offset between the moment when the DCI is received and the corresponding PDSCH is less than the preset threshold, at least two DMRS port groups of the PDSCH are respectively configured with or predefined as the default TCI state; and in the multi-TRP scenario, when the time offset is less than the threshold, it may be avoided that the terminal equipment can only receive a PDSCH transmitted by one TRP.

In an embodiment, in a case where the terminal equipment is configured to perform signal transmission with multiple transmission points, it is not expected that a parameter indicating a dynamic TCI state (such as TCI-PresentInDCI) of a control resource set used to transmit the DCI is not enabled. This embodiment is directed to the case shown in C in FIG. 2.

For example, in a multi-TRP scenario, a PDCCH and a PDSCH scheduled thereby may be transmitted by different TRPs/cells. If TCI-PresentInDCI of a CORESET used in transmitting the PDCCH is set to be disabled, when the time offset is greater than the threshold, the terminal equipment will be in default that a TCI state of the PDSCH is consistent with a TCI state of the CORESET transmitting the PDCCH; while at this moment, the PDSCH may be transmitted by another TRP, and its TCI state is different from the TCI state of the PDCCH.

In an embodiment, the terminal equipment does not expect that the parameter indicating the dynamic TCI state (such as TCI-PresentInDCI) of the control resource set used for transmitting the DCI is disabled.

For example, the terminal equipment does not expect that all parameters indicating the dynamic TCI of multiple (e.g. all) control resource sets used for transmitting the DCI are disabled.

For another example, in a multi-TRP scenario, if a piece of DCI contains scheduling grants of multiple PDSCHs, the DCI may contain multiple TCI fields.

In an embodiment, when the parameter (such as TCI-PresentInDCI) of the control resource set transmitting the DCI used for indicating the dynamic TCI state is not enabled, the terminal equipment may further acquire a default TCI state from the DCI. One or more default TCI states may be configured via signaling transmitted by the network device, and/or, the one or more default TCI states may be predefined.

For example, as the default TCI state in this embodiment is the default state after the above threshold, the DCI may already be successfully decoded at this moment, hence the DCI may be used to indicate the default TCI state. That is, when TCI-PresentInDCI carrying the CORESET of the DCI is disabled, the DCI may be used to indicate the default TCI state.

For example, RRC signaling may be used to configure multiple default states, including, for example, the same default state as the single-point transmission (the TCI state of the CORESET scheduling the PDSCH), and one or more other TCI states (for example, antenna ports in one or more DMRS ports of the PDSCH and a TCI state of a CORESET with a CORESET ID of i are QCL); and the DCI may be used again to indicate to the terminal equipment which default TCI states of the PDSCH scheduled by DCI is the default TCI state configured by RRC signaling.

For another example, the mode of RRC plus DCI is still used for indication, but the default state same as that in the single-point transmission needs not to be configured, because this state is also a TCI state corresponding to a CORESET. Therefore, one or more TCI states of a CORESET may be configured in the RRC as the default TCI state of the PDSCH. For example, IDs of CORESETs configured in a current slot are i, j, and k, respectively; hence, default TCI states configured by the RRC signaling are that: antenna ports in one or more DMRS port groups of the PDSCH and a TCI state of a CORESET with a CORESET ID i are QCL; antenna ports in one or more DMRS port groups of the PDSCH and a TCI state of a CORESET with a CORESET ID j are QCL; antenna ports in one or more DMRS port groups of the PDSCH and a TCI state of a CORESET with a CORESET ID k are QCL; and so on.

For a further example, a variety of default TCI states may be predefined in a protocol. For example, TCI states of all CORESETs configured in a current slot may be taken as candidate default TCI states, hence, only DCI is needed for indication.

Therefore, even in a multi-TRP scenario, a PDCCH and a PDSCH scheduled thereby may be transmitted by different TRPs/cells, and the terminal equipment may correctly receive transmission information transmitted by the multiple TRPs.

In an embodiment, in a multi-TRP scenario, non-coherent joint transmission (NC-JT) and dynamic point selection (DPS) are dynamically switched. From the perspective of the terminal equipment, a current TCI status and/or QCL parameter need to be correctly determined to correctly receive signals transmitted by multiple TRPs/antenna panels/cells.

For example, the terminal equipment may determine that at least two TCI states of one or more DM-RS port groups of the PDSCH are valid. The at least two valid TCI states may include: a TCI state activated according to indication information, and/or a default TCI state. For example, it may include a TCI state activated according to the indication information and a default TCI state, or may include two TCI states activated according to the indication information, or may include two default TCI states.

For example, at least two TCI states may come from multiple TRPs/antenna panels/cells, that is, regardless of whether a current transmission mode is NC-JT or DPS, the terminal equipment always assumes that beam indication from multiple TRPs/antenna panels/cells or default QCL parameters are all valid.

For another example, at an n-th slot, the terminal equipment receives scheduling information indicating an (n+k)-th slot transmitted by the network device, and determines the TCI state or the transmission scheme at the (n+k)-th slot according to the scheduling information; where, n is an integer greater than or equal to 0, and k is an integer greater than or equal to 1.

That is, it may be assumed that former k slots indicate a scheduling situation of the current slot. For example, it is indicated in slot n-k that PDSCH transmission of slot n contains DMRS port group 1, or contain DMRS port group 2, or use DMRS port groups 1 and 2 simultaneously; and when a maximum number of DMRS port groups is greater than 2, corresponding indication fields will also be increased. That is, scheduling latency of k slots is allowed. Hence, the terminal equipment needs not to assume that beams transmitted by multiple TRPs come into operation simultaneously; and especially in the DPS operation, energy consumption of the terminal equipment may further be saved.

It should be noted that the above embodiments only illustrate some examples of this disclosure. However, this disclosure is not limited thereto, and appropriate variants may be made to these embodiments. For example, the above embodiments may be executed separately, or one or more of them may be executed in a combined manner.

It can be seen from the above embodiments that the receiving device configures or predefines one or more TCI states for one or more DMRS port groups. Hence, even in scenarios such as multiple TRPs or multiple panels, the receiving device may correctly and punctually receive transmission information transmitted by the transmitting device.

Embodiment 2

The embodiments of this disclosure provide a method for transmitting configuration information, with contents identical to those in Embodiment 1 being not going to be described herein any further.

Figure 5:
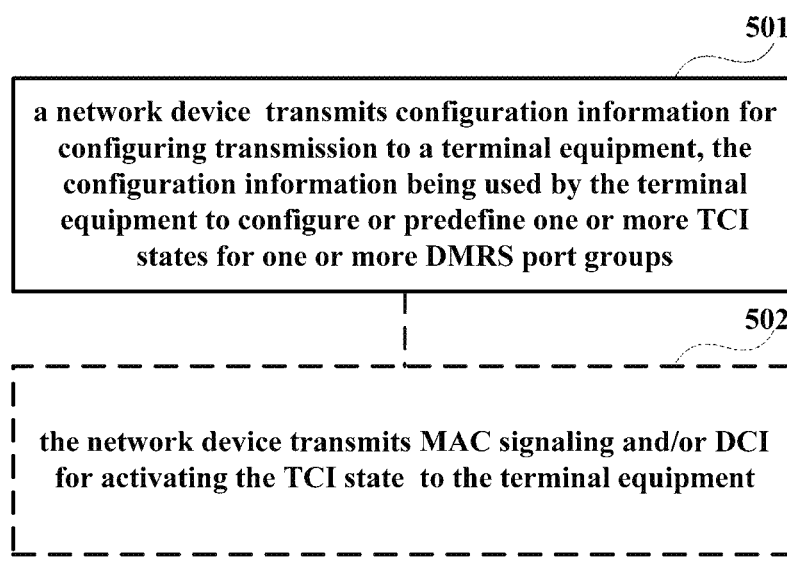
FIG. 5 is a schematic diagram of the method for transmitting configuration information of an embodiment of this disclosure.

FIG. 5 is a schematic diagram of the method for transmitting configuration information of the embodiment of this disclosure, in which a case at a network device side is shown. As shown in FIG. 5, the method includes:

step 501: a network device transmits configuration information for configuring transmission to a terminal equipment, the configuration information being used by the terminal equipment to configure or predefine one or more transmission configuration indication states for one or more demodulation reference signal port groups.

For example, the configuration information may be carried by RRC signaling.

As shown in FIG. 5, the method may further include:

step 502: the network device transmits medium access control signaling and/or downlink control information for activating the transmission control indication state to the terminal equipment.

It should be noted that FIG. 5 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

In an embodiment, the network device may configure a transmission scheme and/or one or more parameters for the terminal equipment. And the terminal equipment may determine the TCI status and/or QCL parameters of the DMRS port groups of one or more physical channels according to the transmission scheme and/or parameters configured by the network device.

In an embodiment, when the time offset between the moment when the DCI is received and the corresponding PDSCH is less than a preset threshold, one or more DM-RS port groups of the PDSCH are configured with or predefined as default TCI states. The antenna ports of the DMRS port group of the PDSCH and one or more reference signal sets in one or more control resource sets are spatially quasi-co-located.

For example, the one or more reference signal sets may be at least two reference signal sets to which an activated TCI state in a control resource set with a lowest control resource set identification corresponds; or at least two reference signal sets to which at least two activated TCI states in a control resource set with a lowest control resource set identification correspond; or at least two reference signal sets to which a default TCI state in at least two control resource sets corresponds.

In an embodiment, in a case where the terminal equipment is configured to perform signal transmission with multiple transmission points, the network device determines that the parameter of the control resource set used for transmitting the DCI indicating the dynamic TCI state is not disabled.

In an embodiment, the network device determines that parameters of multiple (e.g. all) control resource sets for transmitting the DCI indicating the dynamic TCI state are not all disabled.

In an embodiment, when the parameters of the control resource sets for transmitting the DCI indicating the dynamic TCI state are not disabled, the network device includes the default TCI state in the DCI. One or more default TCI states may be configured via signaling transmitted by the network device, and/or, the one or more default TCI states may also be predefined.

In an embodiment, the network device may transmit scheduling information indicating an (n+k)-th slot in an n-th slot; and the terminal equipment may determine the TCI states or transmission scheme at the (n+k)-th slot according to the scheduling information.

It should be noted that the above embodiments only illustrate some examples of this disclosure. However, this disclosure is not limited thereto, and appropriate variants may be made to these embodiments. For example, the above embodiments may be executed separately, or one or more of them may be executed in a combined manner.

It can be seen from the above embodiments that the transmitting device transmits the configuration information to the receiving device, such that the receiving device configures or predefines one or more TCI states for one or more DMRS port groups. Hence, even in scenarios such as multiple TRPs or multiple panels, the receiving device may correctly and punctually receive transmission information transmitted by the transmitting device.

Embodiment 3

The embodiments of this disclosure provide an apparatus for receiving configuration information. The apparatus may be, for example, a terminal equipment, or may be one or more components or assemblies configured in a terminal equipment. Contents in the embodiments identical to those in Embodiment 1 shall not be described herein any further.

Figure 6:
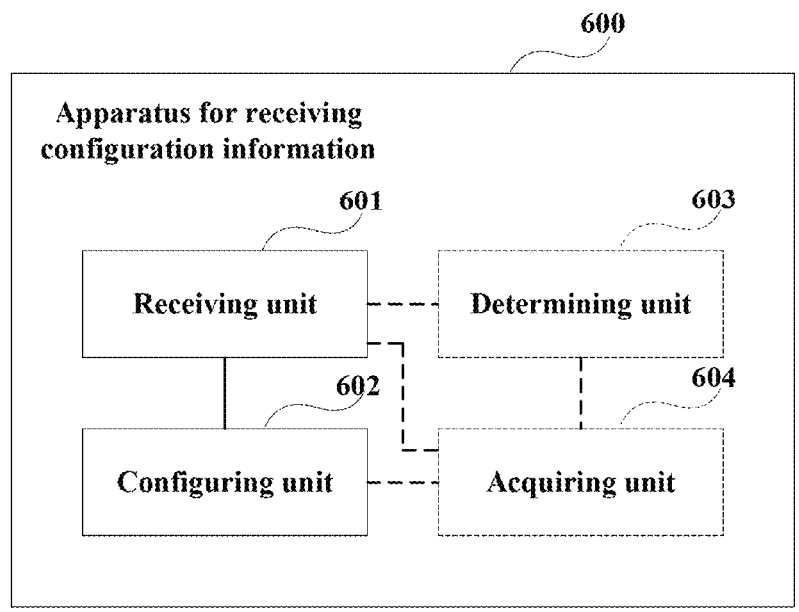
FIG. 6 is a schematic diagram of the apparatus for receiving configuration information of an embodiment of this disclosure.

FIG. 6 is a schematic diagram of the apparatus for receiving configuration information of an embodiment of this disclosure. As shown in FIG. 6, an apparatus 600 for receiving configuration information includes:

a receiving unit 601 configured to receive configuration information transmitted by a network device for configuring transmission; and a configuring unit 602 configured to configure or predefine one or more transmission configuration indication states for one or more demodulation reference signal port groups based on the configuration information.

For example, the configuration information is carried by RRC signaling. And the receiving unit 601 may further be configured to receive media access control signaling and/or downlink control information transmitted by the network device and used to activate the transmission configuration indication state.

In an embodiment, as shown in FIG. 6, the apparatus 600 for receiving configuration information may further include:

a determining unit 603 configured to determine transmission configuration indication states and/or spatial quasi-co-location parameters of demodulation reference signal port groups of one or more physical channels according to a transmission scheme and/or parameter configured by the network device.

In an embodiment, when an offset between the downlink control information and a corresponding physical downlink shared channel is less than a predetermined threshold, one or more demodulation reference port groups of the physical downlink shared channel are configured or predefined with a default transmission configuration indication states. An antenna port of the demodulation reference port group of the physical downlink shared channel and one or more reference signal sets of one or more control resource sets are spatially quasi-co-located.

For example, the one or more reference signal sets are at least two reference signal sets corresponding to an activated transmission configuration indication state in a control resource set having lowest control resource set identification.

For example, the one or more reference signal sets are at least two reference signal sets corresponding to at least two activated transmission configuration indication states in the control resource set having lowest control resource set identification.

For a further example, the one or more reference signal sets are at least two reference signal sets corresponding to a transmission configuration indication state configured as being of default in the at least two control resource sets.

In an embodiment, the determining unit 603 may further be configured, in a case where a terminal equipment is configured to perform signal transmission with multiple transmission points, not to expect that a parameter indicating a dynamic transmission configuration indication state of a control resource set for transmitting the downlink control information is disabled.

In an embodiment, the determining unit 603 may further be not to expect that parameters indicating dynamic transmission configuration indication states of multiple control resource sets for transmitting the downlink control information are disabled.

In an embodiment, as shown in FIG. 6, the apparatus 600 for receiving configuration information may further include:
    an acquiring unit 604 configured to, when a parameter indicating a dynamic transmission configuration indication state of a control resource set for transmitting the downlink control information is disabled, acquire a default transmission configuration indication state from the downlink control information.

For example, one or more default transmission configuration indication states may be configured via signaling transmitted by the network device, and/or the one or more default transmission configuration indication states may be predefined.

In an embodiment, the determining unit 603 may further be configured to determine that at least two transmission configuration indication states of one or more demodulation reference signal port groups of a physical downlink shared channel are valid. The at least two valid transmission configuration indication states may include a transmission configuration indication state that is activated according to indication information, and/or, a default transmission configuration indication state.

In an embodiment, the receiving unit 601 may further be configured to receive, at an n-th slot, scheduling information indicating an (n+k)-th slot transmitted by the network device; and the configuring unit 602 may further be configured to determine the transmission configuration indication state or a transmission scheme at the (n+k)-th slot according to the scheduling information.

It should be noted that the components or modules related to this disclosure are only described above. However, this disclosure is not limited thereto, and the apparatus 600 for receiving configuration information may further include other components or modules, and reference may be made to related techniques for particulars of these components or modules.

Furthermore, for the sake of simplicity, connection relationships between the components or modules or signal profiles thereof are only illustrated in FIG. 6. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the receiving device configures or predefines one or more TCI states for one or more DMRS port groups. Hence, even in scenarios such as multiple TRPs or multiple panels, the receiving device may correctly and punctually receive transmission information transmitted by the transmitting device.

Embodiment 4

The embodiments of this disclosure provide an apparatus for transmitting configuration information. The apparatus may be, for example, a network device, or may be one or more components or assemblies configured in a network device. Contents in the embodiments identical to those in Embodiment 2 shall not be described herein any further.

Figure 7:
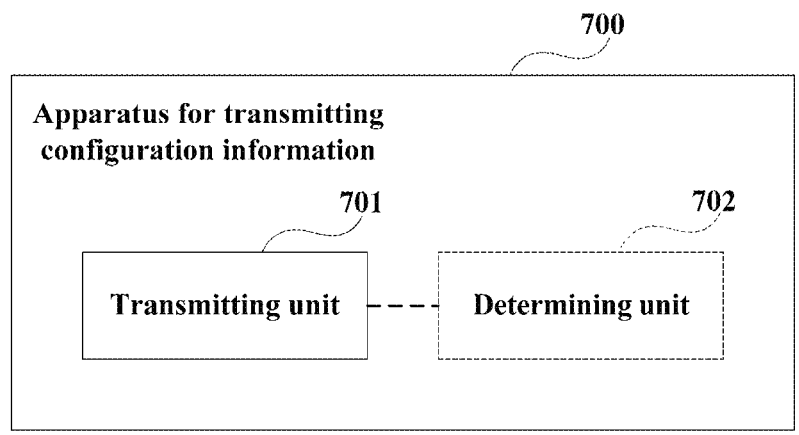
FIG. 7 is a schematic diagram of the apparatus for transmitting configuration information of an embodiment of this disclosure.

FIG. 7 is a schematic diagram of the apparatus for transmitting configuration information of the embodiment of this disclosure. As shown in FIG. 7, an apparatus 700 for transmitting configuration information includes:
    a transmitting unit 701 configured to transmit configuration information for configuring transmission to a terminal equipment, the configuration information being used by the terminal equipment to configure or predefine one or more transmission configuration indication states for one or more demodulation reference signal port groups.

For example, the configuration information is carried by RRC signaling. And the transmitting unit 701 may further be configured to transmit medium access control signaling and/or downlink control information for activating the transmission control indication state to the terminal equipment.

In an embodiment, the transmitting unit 701 may further be configured to transmit a transmission scheme and/or parameter, and the terminal equipment determines transmission configuration indication states and/or spatial quasi-co-location parameters of demodulation reference signal port groups of one or more physical channels according to the transmission scheme and/or parameter configured by the network device.

In an embodiment, when the offset between the downlink control information and the corresponding physical downlink shared channel is less than a preset threshold, one or more demodulation reference signal port groups of the physical downlink shared channel are configured with or pre-defined as default transmission configuration indication states.

In an embodiment, as shown in FIG. 7, the apparatus 700 for transmitting configuration information may further include:
    a determining unit 702 configured to, in a case where the terminal equipment is configured to perform signal transmission with multiple transmission points, determine that the parameter of the control resource set used for transmitting the downlink control information indicating the dynamic transmission configuration indication state is disabled.

In an embodiment, the determining unit 702 is further configured to: when the parameter of the control resource set used for transmitting the downlink control information indicating the dynamic transmission configuration indication state is disabled, contain the default transmission configuration indication state in the downlink control information.

In an embodiment, the transmitting unit 701 may further be configured to: transmitting scheduling information indicating an (n+k)-th slot at an n-th slot; and the terminal equipment determines the transmission configuration indication state or transmission scheme at the (n+k)-th slot according to the scheduling information.

It should be noted that the components or modules related to this disclosure are only described above. However, this disclosure is not limited thereto, and the apparatus 700 for transmitting configuration information may further include other components or modules, and reference may be made to related techniques for particulars of these components or modules.

Furthermore, for the sake of simplicity, connection relationships between the components or modules or signal profiles thereof are only illustrated in FIG. 6. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the transmitting device transmits the configuration information to the receiving device, such that the receiving device configures or predefines one or more TCI states for one or more DMRS port groups. Hence, even in scenarios such as multiple TRPs or multiple panels, the receiving device may correctly and punctually receive transmission information transmitted by the transmitting device.

Embodiment 5

The embodiments of this disclosure provide a communication system, and reference may be made to FIG. 1, with contents identical to those in embodiments 1~4 being not going to be described herein any further. In an embodiment, the communication system 100 may include:
a network device 101, including the apparatus 700 for transmitting configuration information as described in Embodiment 4; and
a terminal equipment 102, including the apparatus 600 for receiving configuration information as described in Embodiment 3.

The embodiment of this disclosure further provides a network device, which may be, for example, a base station. However, this disclosure is not limited thereto, and it may also be another network device.

Figure 8:
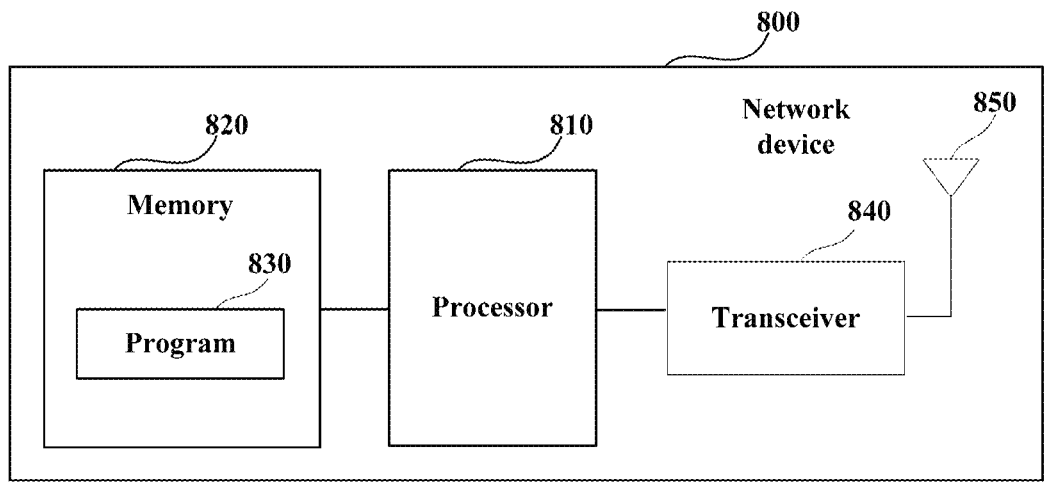
FIG. 8 is a schematic diagram of the network device of an embodiment of this disclosure.

FIG. 8 is a schematic diagram of a structure of the network device of the embodiment of this disclosure. As shown in FIG. 8, a network device 800 may include a processor 810 (such as a central processing unit (CPU)) and a memory 820, the memory 820 being coupled to the processor 810. The memory 820 may store various data, and furthermore, it may store a program 830 for data processing, and execute the program 830 under control of the processor 810.

For example, the processor 810 may be configured to execute the program 830 to carry out the method for transmitting configuration information described in Embodiment 2. For example, the processor 810 may be configured to execute the following control: transmitting configuration information for configuring transmission to a terminal equipment, the configuration information being used by the terminal equipment to configure or predefine one or more transmission configuration indication states for one or more demodulation reference signal port groups.

In an embodiment, the configuration information is carried by radio resource control signaling.

In an embodiment, the processor 810 may further be configured to execute the following control: transmitting medium access control signaling and/or downlink control information for activating the transmission control indication state to the terminal equipment.

Furthermore, as shown in FIG. 8, the network device 800 may include a transceiver 840, and an antenna 850, etc. Functions of the above components are similar to those in the relevant art, and shall not be described herein any further. It should be noted that the network device 800 does not necessarily include all the parts shown in FIG. 8, and furthermore, the network device 800 may include parts not shown in FIG. 8, and the relevant art may be referred to.

The embodiment of this disclosure further provides a terminal equipment; however, this disclosure is not limited thereto, and it may also be another equipment.

Figure 9:
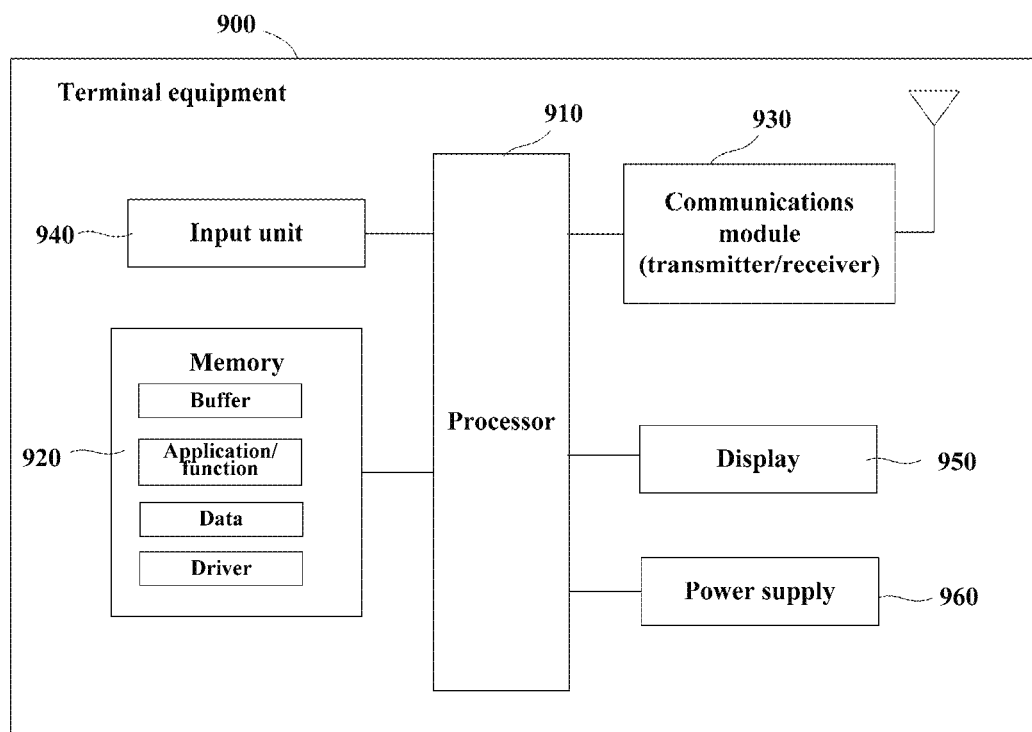
FIG. 9 is a schematic diagram of the terminal equipment of an embodiment of this disclosure.

FIG. 9 is a schematic diagram of the terminal equipment of the embodiment of this disclosure. As shown in FIG. 9, a terminal equipment 900 may include a processor 910 and a memory 920, the memory 920 storing data and a program and being coupled to the processor 910. It should be noted that his figure is illustrative only, and other types of structures may also be used, so as to supplement or replace this structure and achieve a telecommunications function or other functions.

For example, the processor 910 may be configured to execute a program to carry out the method for receiving configuration information described in Embodiment 1. For example, the processor 910 may be configured to execute the following control: configuring or predefining one or more transmission configuration indication states for one or more demodulation reference signal port groups.

In an embodiment, the processor 910 may further be configured to execute the following control: receiving configuration information transmitted by a network device for configuring transmission; the configuration information is carried by radio resource control signaling.

In an embodiment, the processor 910 may further be configured to execute the following control: receiving media access control signaling and/or downlink control information transmitted by the network device and used to activate the transmission configuration indication state.

In an embodiment, the processor 910 may further be configured to execute the following control: determining transmission configuration indication states and/or spatial quasi-co-location parameters of demodulation reference signal port groups of one or more physical channels according to a transmission scheme and/or parameter configured by the network device.

In an embodiment, when an offset between the downlink control information and a corresponding physical downlink shared channel is less than a predetermined threshold, one or more demodulation reference port groups of the physical downlink shared channel are configured or predefined with default transmission configuration indication states.

In an embodiment, an antenna port of the demodulation reference port group of the physical downlink shared channel and one or more reference signal sets of one or more control resource sets are spatially quasi-co-located.

In an embodiment, the one or more reference signal sets are at least two reference signal sets corresponding to an activated transmission configuration indication state in a control resource set having lowest control resource set identification.

In an embodiment, the one or more reference signal sets are at least two reference signal sets corresponding to at least two activated transmission configuration indication states in the control resource set having lowest control resource set identification.

In an embodiment, the one or more reference signal sets are at least two reference signal sets corresponding to a transmission configuration indication state configured as being of default in at least two control resource sets.

In an embodiment, the processor 910 may further be configured to execute the following control: in a case where a terminal equipment is configured to perform signal transmission with multiple transmission points, not expecting that a parameter indicating a dynamic transmission configuration indication state of a control resource set for transmitting the downlink control information is disabled.

In an embodiment, the processor 910 may further be configured to execute the following control: not expecting that parameters indicating dynamic transmission configuration indication states of multiple control resource sets for transmitting the downlink control information are disabled.

In an embodiment, the processor 910 may further be configured to execute the following control: when a parameter indicating a dynamic transmission configuration indication state of a control resource set for transmitting the downlink control information is disabled, acquiring a default transmission configuration indication state from the downlink control information.

In an embodiment, one or more default transmission configuration indication states are configured via signaling transmitted by the network device, and/or the one or more transmission configuration indication states are predefined.

In an embodiment, the processor 910 may further be configured to execute the following control: determining that at least two transmission configuration indication states of one or more demodulation reference signal port groups of a physical downlink shared channel are valid.

In an embodiment, the at least two valid transmission configuration indication states include a transmission configuration indication state that is activated according to indication information, and/or, a default transmission configuration indication state.

In an embodiment, the processor 910 may further be configured to execute the following control: at an n-th slot, receiving scheduling information indicating an (n+k)-th slot transmitted by the network device; and determining the transmission configuration indication state or a transmission scheme at the (n+k)-th slot according to the scheduling information.

As shown in FIG. 9, the terminal equipment 900 may further include a communication module 930, an input unit 940, a display 950, and a power supply 960; functions of the above components are similar to those in the relevant art, which shall not be described herein any further. It should be noted that the terminal equipment 900 does not necessarily include all the parts shown in FIG. 9, and the above components are not necessary. Furthermore, the terminal equipment 900 may include parts not shown in FIG. 9, and the relevant art may be referred to.

An embodiment of this disclosure provides a computer readable program, which, when executed in a network device, will cause the network device to carry out the method for transmitting configuration information described in Embodiment 2.

An embodiment of this disclosure provides a storage medium, including a computer readable program, which will cause a network device to carry out the method for transmitting configuration information described in Embodiment 2.

An embodiment of this disclosure provides a computer readable program, which, when executed in a terminal equipment, will cause the terminal equipment to carry out the method for receiving configuration information described in Embodiment 1.

An embodiment of this disclosure provides a storage medium, including a computer readable program, which will cause a terminal equipment to carry out the method for receiving configuration information described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

For implementations of this disclosure containing the above embodiments, following supplements are further disclosed.

Supplement 1. A terminal equipment, including:
a configuring unit configured to configure or pre-define one or more transmission configuration indication states for one or more demodulation reference signal port groups.

Supplement 2. The terminal equipment according to supplement 1, wherein the terminal equipment further includes:
a receiving unit configured to receive radio resource control signaling including the configuration information transmitted by the network device.

Supplement 3. The terminal equipment according to supplement 2, wherein the receiving unit is further configured to receive media access control signaling and/or downlink control information transmitted by the network device and used to activate the transmission configuration indication state.

Supplement 4. The terminal equipment according to supplement 2, wherein the terminal equipment further includes:
a determining unit configured to determine transmission configuration indication states and/or spatial quasi-co-location parameters of demodulation reference signal port groups of one or more physical channels according to a transmission scheme and/or parameter configured by the network device.

Supplement 5. The terminal equipment according to supplement 3, wherein when an offset between the downlink control information and a corresponding physical downlink shared channel is less than a predetermined threshold, one or more demodulation reference port groups of the physical downlink shared channel are configured or predefined with default transmission configuration indication states.

Supplement 6. The terminal equipment according to supplement 5, wherein an antenna port of the demodulation reference port group of the physical downlink shared channel and one or more reference signal sets of one or more control resource sets are spatially quasi-co-located.

Supplement 7. The terminal equipment according to supplement 6, wherein the one or more reference signal sets are at least two reference signal sets corresponding to an activated transmission configuration indication state in a control resource set having lowest control resource set identification.

Supplement 8. The terminal equipment according to supplement 6, wherein the one or more reference signal sets are at least two reference signal sets corresponding to at least two activated transmission configuration indication states in the control resource set having lowest control resource set identification.

Supplement 9. The terminal equipment according to supplement 6, wherein the one or more reference signal sets are at least two reference signal sets corresponding to a transmission configuration indication state configured as being of default in the at least two control resource sets.

Supplement 10. A terminal equipment, including:
a determining unit configured, in a case where the terminal equipment is configured to perform signal transmission with multiple transmission points, not to expect that a parameter indicating a dynamic transmission configuration indication state of a control resource set for transmitting the downlink control information is disabled.

Supplement 11. The terminal equipment according to supplement 10, wherein determining unit is further configured not to expect that parameters indicating dynamic transmission configuration indication states of multiple control resource sets for transmitting the downlink control information are disabled.

Supplement 12. The terminal equipment according to supplement 10, wherein the terminal equipment further includes:
an acquiring unit configured to, when a parameter indicating a dynamic transmission configuration indication state of a control resource set for transmitting the downlink control information is disabled, acquire a default transmission configuration indication state from the downlink control information.

Supplement 13. The terminal equipment according to supplement 12, wherein one or more default transmission configuration indication states are configured via signaling transmitted by the network device, and/or the one or more transmission configuration indication states are predefined.

Supplement 14. A terminal equipment, including:
a determining unit configured to determine that at least two transmission configuration indication states of one or more demodulation reference signal port groups of a physical downlink shared channel are valid.

Supplement 15. The terminal equipment according to supplement 14, wherein the at least two valid transmission configuration indication states include a transmission configuration indication state that is activated according to indication information, and/or, a default transmission configuration indication state.

Supplement 16. A terminal equipment, including:
a receiving unit configured to receive, at an n-th slot, scheduling information indicating an (n+k)-th slot transmitted by a network device; and
a configuring unit configured to determine the transmission configuration indication state or a transmission scheme at the (n+k)-th slot according to the scheduling information.

What is claimed is:
1. A terminal comprising:
a receiver configured to receive, from a network device, a first signal including configuration information; and
a processor configured to configure a transmission configuration indication state for a demodulation reference signal port group based on the configuration information, wherein
the receiver is further configured to receive, from the network device, a second signal for instructing activation the transmission configuration indication state, and when an offset between a downlink control information and a physical downlink shared channel corresponding the downlink control information is less than a predetermined threshold, the demodulation reference signal port group of the physical downlink shared channel is configured or predefined with a predetermined transmission configuration indication state.

2. The terminal according to claim 1, wherein,
the processor is further configured to configure a plurality of transmission configuration indication states including the transmission configuration indication state, and
the second signal is a signal for instructing activation at least one of the plurality of transmission configuration indication states.

3. The terminal according to claim 2, wherein,
each of plurality of transmission configuration indication states is configured for one or more demodulation reference signal port groups including the demodulation reference signal port group.

4. The terminal according to claim 1, wherein
the processor is further configured to acquire, when a parameter indicating a dynamic transmission configuration indication state of a control resource set for transmitting the downlink control information is disabled, the predetermined transmission configuration indication state based on a physical downlink control channel.

5. The terminal according to claim 1, wherein the processor is further configured to determine transmission configuration indication states and/or spatial quasi-co-location parameters of demodulation reference signal port groups of one or more physical channels according to a transmission scheme and/or parameter configured by the network device.

6. The terminal according to claim 1, wherein the demodulation reference signal port group of the physical downlink shared channel is quasi-co-located with the one or more reference signal sets related to quasi-co-location parameter(s) of a control resource set.

7. The terminal according to claim 6, wherein the one or more reference signal sets are at least two reference signal sets corresponding to an activated transmission configuration indication state in a control resource set having lowest control resource set identification.

8. The terminal according to claim 6, wherein the one or more reference signal sets are at least two reference signal sets corresponding to at least two activated transmission configuration indication states in the control resource set having lowest control resource set identification.

9. The terminal according to claim 6, wherein the one or more reference signal sets are at least two reference signal sets corresponding to a transmission configuration indication state configured as being of predetermined in at least two control resource sets.

10. The terminal according to claim 1, wherein
the receiver is further configured to receive, at an n-th slot, from the network device, scheduling information indicating an (n+k)-th slot, and
the processor is further configured to determine the transmission configuration indication state or a transmission scheme at the (n+k)-th slot according to the scheduling information, where n is an integer greater than or equal to 0, and k is an integer greater than or equal to 1.

11. The terminal according to claim 1, wherein
the receiver configured to receive, from the network device, the second signal via a media access control signaling.

12. The terminal according to claim 1, wherein the downlink control information is transmitted via a physical downlink control channel.

13. A network device comprising:
a processor configured to generate configuration information that is used for configuring a transmission configuration indication state for a demodulation reference signal port group by a terminal; and
a transmitter configured to:
transmit, to the terminal, a first signal including the configuration information; and
transmit, to the terminal, a second signal for instructing activation the transmission configuration indication state, wherein
when an offset between a downlink control information and a physical downlink shared channel corresponding the downlink control information is less than a predetermined threshold, the demodulation reference signal port group of the physical downlink shared channel is configured or predefined with a predetermined transmission configuration indication state.

14. A wireless network system comprising:
a network device configured to transmit a first signal including configuration information; and
a terminal configured to:
receive the first signal from the network device, and
configure a transmission configuration indication state for a demodulation reference signal port group based on the configuration information, wherein
the network device transmits, to the terminal, a second signal for instructing activation the transmission configuration indication state,
when an offset between a downlink control information and a physical downlink shared channel corresponding the downlink control information is less than a predetermined threshold, the demodulation signal reference port group of the physical downlink shared channel is configured or predefined with a predetermined transmission configuration indication state.

* * * * *